United States Patent
Yoder et al.

(10) Patent No.: US 6,779,329 B2
(45) Date of Patent: Aug. 24, 2004

(54) VINOUS CROP HARVESTING APPARATUS AND METHOD

(75) Inventors: Joseph Yoder, Danube, CA (US); Matthew Moyer, New Berlin, PA (US)

(73) Assignee: Pik Rite, Inc., Lewisburg, PA (US)

(*) Notice: Subject to any disclaimer, the term of this patent is extended or adjusted under 35 U.S.C. 154(b) by 0 days.

(21) Appl. No.: 09/960,615

(22) Filed: Sep. 21, 2001

(65) Prior Publication Data

US 2002/0069633 A1 Jun. 13, 2002

Related U.S. Application Data

(60) Provisional application No. 60/288,000, filed on May 2, 2001, and provisional application No. 60/234,268, filed on Sep. 21, 2000.

(51) Int. Cl.[7] .............................................. A01D 46/00
(52) U.S. Cl. ..................................................... 56/330
(58) Field of Search ............................. 56/328.1, 327.1, 56/27.5, 230, 231, 233, 333, DIG. 2, DIG. 10

(56) References Cited

U.S. PATENT DOCUMENTS

| | | | | |
|---|---|---|---|---|
| 1,067,378 A | * | 7/1913 | Shane | 171/38 |
| 1,405,885 A | * | 2/1922 | Woodson | 198/626.6 |
| 1,439,187 A | * | 12/1922 | Pocock | 171/33 |
| 2,515,966 A | * | 7/1950 | Polisena | 198/522 |
| 2,561,754 A | * | 7/1951 | Propheter | 56/345 |
| 3,252,464 A | | 5/1966 | Hill et al. | 130/30 |
| 3,344,591 A | | 10/1967 | Christie et al. | 56/330 |
| 3,455,453 A | | 7/1969 | Hill | 209/396 |
| 3,618,617 A | | 11/1971 | Gates et al. | 130/30 |
| 3,666,017 A | | 5/1972 | Gates et al. | 171/27 |
| 3,760,574 A | | 9/1973 | Tassone | 56/330 |
| 3,959,959 A | | 6/1976 | Louault et al. | 56/330 |
| 3,986,561 A | | 10/1976 | Bettencourt et al. | 171/14 |
| 4,033,099 A | | 7/1977 | Friedel, Jr. et al. | 56/327 R |
| 4,111,210 A | | 9/1978 | Freeman et al. | 130/30 R |
| 4,147,017 A | | 4/1979 | Cortopassi et al. | 56/16.5 |
| 4,157,005 A | | 6/1979 | Orlando et al. | 56/228 |
| 4,232,506 A | | 11/1980 | Studer | 56/327 R |
| 4,234,045 A | | 11/1980 | Porter | 171/14 |
| 4,261,163 A | | 4/1981 | Shaw | 56/327 R |
| 4,276,738 A | * | 7/1981 | Ferraro | 56/130 |
| 4,335,570 A | | 6/1982 | Fitzmaurice | 56/327 R |
| 4,365,463 A | | 12/1982 | Bettencourt et al. | 56/327 R |
| 4,570,426 A | | 2/1986 | Bettencourt et al. | 56/327 R |
| 4,722,175 A | * | 2/1988 | Hobhouse | 56/328.1 |
| 4,915,671 A | | 4/1990 | Johnson | 460/59 |
| 4,974,404 A | * | 12/1990 | Korthuis et al. | 56/330 |
| 5,077,963 A | | 1/1992 | Harrison et al. | 56/327.1 |
| 5,099,636 A | | 3/1992 | Yoder | 56/327.1 |
| 5,197,269 A | | 3/1993 | Meester | 56/327.1 |
| 5,247,717 A | * | 9/1993 | Smith | 15/80 |
| 5,287,687 A | * | 2/1994 | Urich et al. | 56/327.1 |
| 5,428,946 A | * | 7/1995 | Hansen et al. | 56/27.5 |
| 5,480,353 A | | 1/1996 | Garza, Jr. | 460/148 |
| 5,573,459 A | | 11/1996 | Meester | 460/145 |
| 5,702,301 A | | 12/1997 | Meester | 460/144 |
| 6,282,877 B1 | * | 9/2001 | Yoder | 56/327.1 |

FOREIGN PATENT DOCUMENTS

| | | |
|---|---|---|
| FR | 2560736 | 9/1995 |
| WO | 94/01996 | 2/1994 |

OTHER PUBLICATIONS

One page article entitled "Michigan Company Specializes in Pickle Harvesters" from the Great Lake Vegetable Growers News, Jan. 1994.
Three page brochure entitled "Belting and Cleating Guide" of Apache Hose & Belting, Inc., date unknown.
One page photograph entitled "See The Cuke Model 8000 Cucumber Harvester Before You Buy . . .", date unknown.
Twenty–five page, two–sided document entitled "A Bibliography On The Mechanical Harvesting Of Pickling Cucumbers And Related Subjects", 2nd Edition, compiled by Dale E. Marshall, Mar. 4, 1993.

* cited by examiner

Primary Examiner—Árpád Fábián Kovács
(74) Attorney, Agent, or Firm—Charles N. Quinn, Esq.

(57) ABSTRACT

Harvesting methods and apparatus provide endless movable arrays of finger members for contacting and strippingly lifting fruits from plants in growing fields with each of the arrays being generally upstanding, longitudinally elongated and having at least a portion which is substantially planar along which the finger members endlessly move upwardly while strippingly lifting the fruits from the plants as the apparatus travels through the growing field.

36 Claims, 10 Drawing Sheets

VINOUS CROP HARVESTING APPARATUS AND METHOD

CROSS-REFERENCE TO RELATED PATENT APPLICATIONS

This patent application is related to and claims the benefit of the priority of U.S. provisional patent applications Nos. 60/234,268, filed Sep. 21, 2000, entitled "Pepper Harvesting Apparatus" and 60/288,000, filed May 2, 2001 entitled "Multiple Row Side-By-Side Stripper Head" under 35 U.S.C. 119 and 120.

INCORPORATION BY REFERENCE

This patent application incorporates by reference the disclosure of U.S. Pat. Nos. 5,099,636 and 6,282,877, both issued in the name of Joseph Yoder and assigned to Pik-Rite, Inc., the assignee of this patent application.

1. Field of the Invention

This invention relates to apparatus and methods for harvesting fruits and vegetables, with special emphasis on harvesting vegetables such as peppers and especially chili peppers grown on vinous plants.

2. Background of the Invention

The benefits of known mechanical harvesting machines are diminished by problems encountered when such machines harvest vinous crops such as tomatoes, cucumbers, and peppers. With such crops which grow close to or on the ground, vines, rocks and dirt often clog the chains of conventional chain-type conveyors used in such machines. Accordingly, the machine must be periodically shut-down and be cleared of vines, rocks and other debris.

Another problem associated with the known mechanical harvesters is the large amount of unharvested fruit that sometimes remains in the field when the machine is used to harvest vinous crops. Typically, a substantial percentage of the fruits are inadequately separated from the vines. As a result, a sizable portion of the otherwise useable crop yield is discarded in the field along with the vines.

Loss of unharvested fruit, especially dried fruits such as chili peppers, sometimes occurs when early maturing fruit falls to the ground. Such fallen fruit, now detached from the vine, is not collected by known vinous fruit mechanical harvesters.

Further, some known vine-growing fruit mechanical harvesters remove the entire vine mass, including roots, and later separate the fruit from the vine mass. Such harvesters are often damaged by dirt and rocks which remain entrained in the vine mass when the vine mass is cut from the roots. These machines which collect and process the entire vine mass in order to harvest the growing ripe fruits are prone to break down, requiring frequent repair in the growing fields and disrupting the harvesting process.

SUMMARY OF THE INVENTION

In one of its aspects, this invention provides harvesting apparatus for detaching and collecting fruits from vinous plants during travel through a growing field, where the apparatus preferably includes a preferably longitudinally elongated frame adapted to be pulled by a tractor. In this aspect of the invention, the apparatus preferably includes at least one pair of mutually facing movable arrays of preferably resilient finger members. The mutually facing arrays preferably are considered to each have mutually perpendicular horizontal and vertical axes, with the horizontal axes of the two arrays being substantially parallel to the ground and with the vertical axes of each array being substantially parallel with each other. Preferably, the arrays rotate about their respective horizontal axes, with one array rotating in the clockwise direction and the second array rotating in the counterclockwise direction. When viewed from above, the mutually facing arrays preferably form a "V"-shape where plants enter the space between the arrays at the wide end of the "V". Upwardly traveling resilient finger members of the two arrays comb the vines along the longitudinal length of the arrays and along the vertical height of the arrays to pick the fruit from the vines.

The upwardly traveling preferably resilient finger members preferably move along paths defining continuous loops on the two arrays. The upwardly traveling preferably resilient finger members traverse the path on a given array beginning at the base of the vines, proximate to the ground, with the path continuing upward along the vines so that the fingers move through the vines until the path reaches the top of the array where the finger members continue around the top of the path of the array and then downward until the finger members reach the base of the array, where the path is repeated. As the finger members move through the vines, the fruit separates from the vines and is transported by the finger members to the top of the array. Before the finger members begin their descent along a backside of the array, the fruit falls from the array, optionally under the influence of a pneumatic conveyor or fan, into a collection device.

In another of its aspects, the invention provides means for collecting fruit which has fallen to the ground using the aforementioned arrays of upwardly traveling, resilient finger members. The mutually facing arrays are positioned preferably substantially vertically such that the traveling finger members are proximal to and move along the surface of the soil when the upwardly traveling finger members are at their lowest point on the array, corresponding to the aforementioned beginning of the path. By being proximal to and moving along the soil, the finger members sweep up and collect fallen fruit from the ground.

The apparatus further preferably includes means for adjusting the apparatus with respect to ground.

In still another of its aspects, this invention embraces a method of harvesting including the steps of advancing a harvesting a device through a growing field, scoopingly urging plants towards an opening between mutually facing arrays of finger members, advanceably positioning the mutually facing moveable arrays of finger members on opposite sides of plants containing fruits to be harvested, rotating the mutually facing arrays of finger members whereby one array rotates in a clockwise direction and the other in a counter-clockwise direction so that both arrays move upwardly in a region in which the arrays are mutually facing and are above the position of the plants growing in the growing field from which fruits are to be harvested thereby upwardly sweeping the plants with the finger members to strippingly remove fruits from the plants. The method further preferably includes transversely sweeping the growing ground during travel of the apparatus thereover to brushingly gather detached fallen fruits off of the ground and into the region within which the arrays face one another so the fruits may be carried to a collection container.

In yet another of its aspects this invention embraces harvesting apparatus including a frame, wheels connected to the frame enabling travel of the apparatus through a growing field of fruits and moveable arrays of finger members carried by the frame for contacting and strippingly lifting fruits from plants in the growing fields, where the array preferably is generally upstanding, longitudinally elongated and has at least a portion which is preferably substantially planar.

In yet another of its aspects this invention embraces harvesting apparatus including a frame, wheels connected to the frame enabling travel of the apparatus through a growing field of fruits and at least one pair of preferably mutually facing moveable preferably endless webs supporting fruit stripping means protruding from the web surfaces, the webs being carried by the frame for strippingly lifting fruits from plants in the growing fields as the webs move along the field with the plants entering between upwardly facing portions of the webs, with the webs preferably being generally upstanding, longitudinally elongated and substantially planar in the region in which the webs are mutually facing.

Desirably, the finger members associated with the webs are formed integrally with the webs and are resilient. Most desirably, the finger members formed integrally with the webs are elastomeric and are homogeneous. The finger members preferably project substantially transversely from the webs which are preferably sheet-like and preferably planar. Most desirably, the webs are of integral, one piece molded construction so that the finger members and the sheet-like portion of the web are homogeneous.

In an alternative embodiment of the invention, the finger members may be rigid in part or in whole. In still another embodiment of the invention, only some of the finger members may be rigid and those members may be only partially rigid.

In another aspect of the invention, the finger members of the two arrays may interdigitate at least in the portion of the region in which the arrays are mutually facing. Desirably, the arrays are more proximate one another remote from the position of entry of the fruit-bearing plants into between the arrays than at the entry position of the fruit-bearing plants into between the arrays.

In another aspect of the invention, the facing portions of the arrays are desirably more proximate one another remote from the growing field than at ground level.

The invention further embraces means for adjusting distance of separation between mutually facing portions of the arrays which further includes means for separately adjusting distance of separation between the respective arrays at forward and rear portions thereof.

The apparatus yet further embraces means for adjustably positioning a selected portion of at least one of the arrays to transversely sweep the growing ground during passage of the apparatus over the ground thereby to brushingly gather detached fallen fruits off of the ground and into the region within which the arrays face one another so that the fallen fruits may be retrieved and processed. Similarly, the method aspect of the invention further embraces the step of transversely sweeping the growing ground to brushingly gather detached fallen fruits off of the ground and into the region in which the arrays face one another so that the fruits may be processed.

In yet another optional aspect of the invention, a high velocity blower gently aids in removal of the fruit from within the upper portion of space between the mutually facing arrays and further directs the fruit onto a conveyor system. This aspect of the invention minimizes bruising, tearing or other damage to the fruit by minimizing force with which the fruit is removed from the plant and by minimizing interactive contact of the harvested fruits with other fruit and parts of the conveyor system.

In yet another aspect the high velocity blower facilitates removal of fruit from within the arrays with the direction of the air flow created by the blower being adjustable.

Another aspect of the invention embodies an array comprising a preferably adjustable portion substantially horizontal with the soil thus forming a wide base array portion. The wide base portion efficiently sweeps a broad region of soil, collecting fallen or discarded fruit lying on the surface of the soil.

Another aspect of the invention embraces guiding and lifting plants into the region between the mutually facing arrays wherein the distance between mutually facing arrays is horizontally adjustable, vertically adjustable or both, to accommodate varying plant sizes and hydration levels as well as varying row widths.

DETAILED DESCRIPTION OF THE PREFERRED EMBODIMENTS AND

THE BEST MODE KNOWN FOR PRACTICING THE INVENTION UNDER 35 U.S.C. 112

Figure 1:
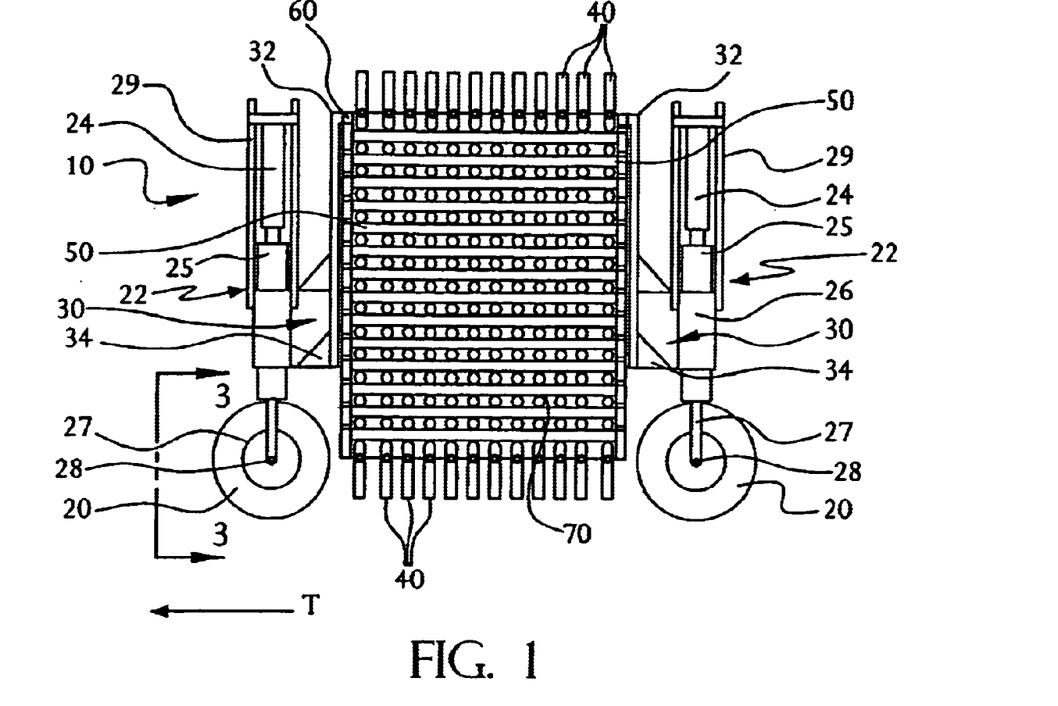
FIG. 1 is a left side elevation in schematic form of a portion of a first embodiment of vegetable harvesting apparatus manifesting aspects of the invention.
Figure 5:
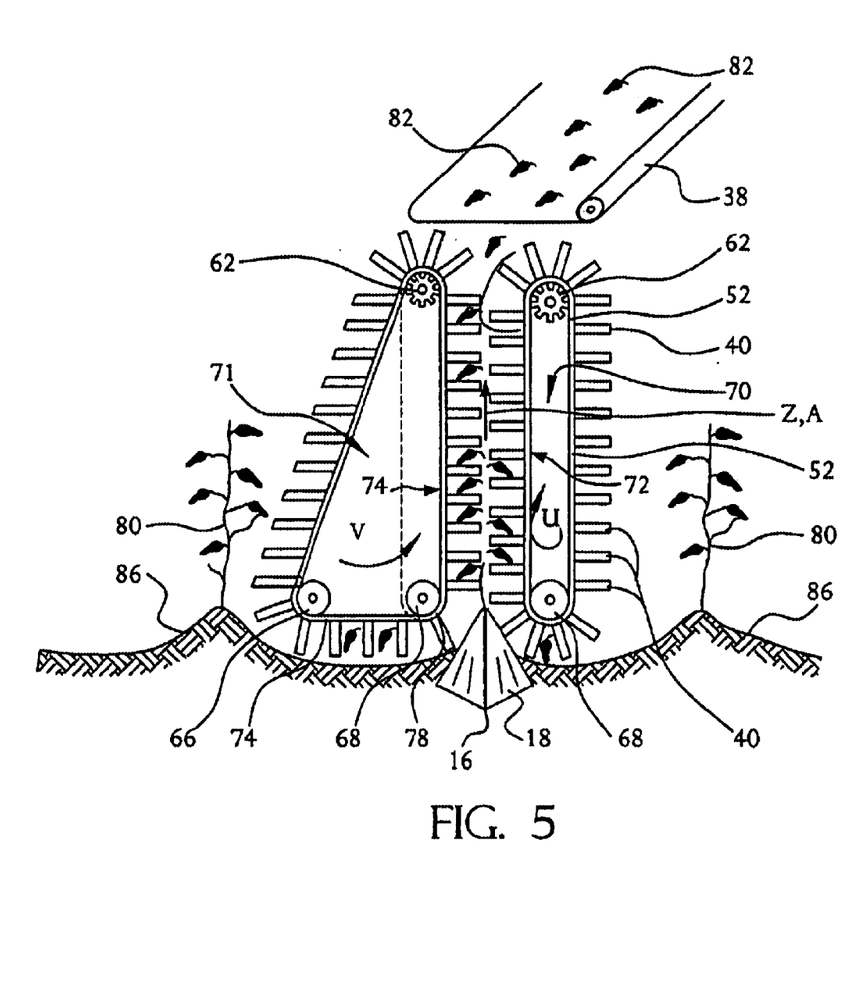
FIG. 5 is an enlarged broken side sectional view in elevation of an array portion of the apparatus taken in direction of arrows 5—5 in FIG. 4.

Referring to the Figures in general and to FIGS. 1 and 5 most particularly, a vinous crop harvesting apparatus 10 manifesting aspects the invention is shown. Apparatus 10 travels through a growing field in the direction indicated by arrow T in FIGS. 1, 6 and 10.

Apparatus 10 comprises a frame 30 (not visible in FIG. 5) adapted to be pulled by a tractor (not shown). Frame 30 preferably includes a longitudinal beam 32 on which four wheel assembly housings 22 and two arrays 70,71 (only arrow 70 is visible in FIG. 1) of resilient finger members 40 are preferably mounted. The four wheel assembly housings 22 mount preferably to frame 30 and particularly to the longitudinal beam 32 portion thereof via support flange members 34 illustrated in FIG. 1.

As an alternate approach, apparatus 10 may be built around a universal farm equipment supporting member adapted to pass through the growing field on tired wheels and having a plurality, desirably four, pneumatically actuated arms extending radially outwardly therefrom. At the end of the each of the pneumatically actuated arms are mounted wheel assembly housings similar to those identified as 22 in FIG. 1. In such case, the fruit stripping structure including preferably resilient fingers 40 is desirably mounted between the respective forward and aft wheel assemblies 22. This particular structure utilizing the universal farm equipment support assembly is not illustrated in the drawings.

In the embodiment illustrated in FIG. 1, apparatus 10 has wheel assembly housings 22 at the forward and aft extremities thereof. Support flange members 34 provide connection not only to the longitudinal beam 32, but also provide support for a track 52, shown best in FIG. 5, within which endless chains 60 ride as chains 60, visible in FIGS. 4 and 10, carry bars 50 along an endless path as described in more detail below.

Figure 2:
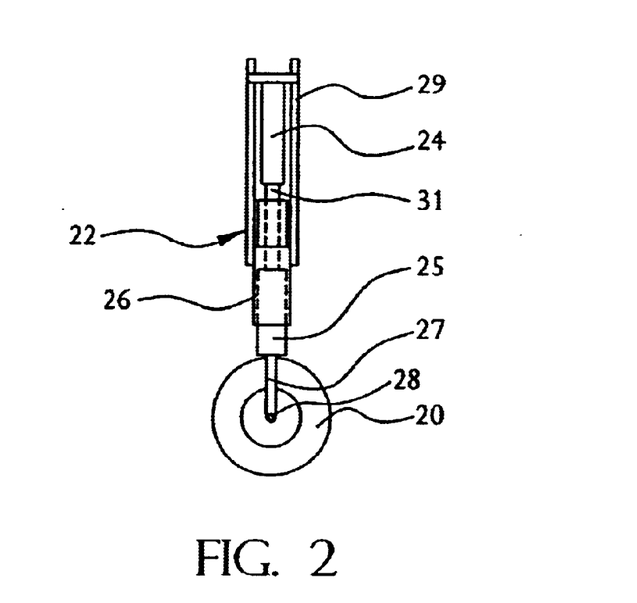
FIG. 2 is an enlarged side elevation of a wheel assembly portion of the apparatus shown in FIG. 1.
Figure 3:
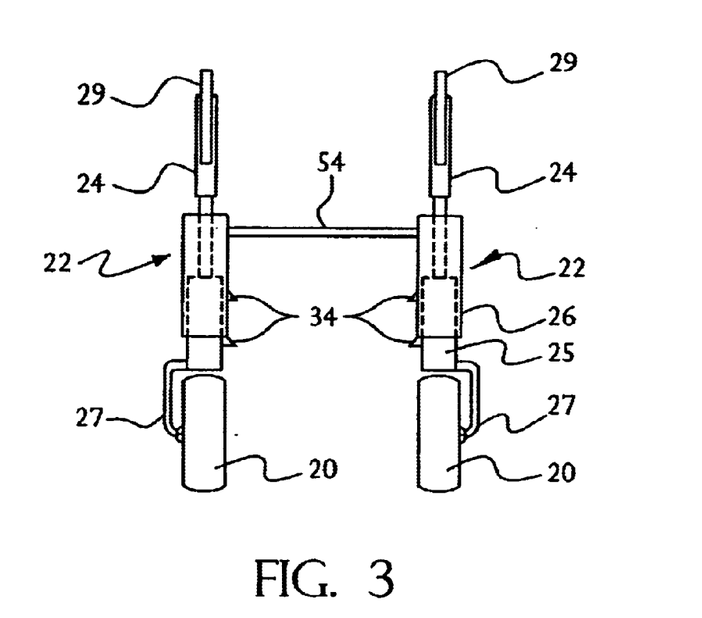
FIG. 3 is a broken schematic view taken in the direction of arrows 3—3 in FIG. 1, showing parts of the apparatus.

Referring more particularly to FIGS. 2 and 3, each wheel assembly housing 22 preferably includes a hydraulic piston-cylinder combination 24 connected to a tubular extension member 25 which in turn preferably connects to a wishbone-type wheel axle support 27 on which a wheel 20 preferably is rotatably mounted. The hydraulic piston-cylinder combination 24 provides a height adjustment function which may be used to maintain frame 30 at a desired height and/or orientation relative the ground as apparatus 10 moves through a growing field. Hydraulic piston-cylinder combination 24 extends or retracts the piston member thereof, thereby raising or lowering the parts of the harvesting apparatus 10 attached to frame member 30 when on uneven or sloped ground. Wheel assembly housings 22 with hydraulic piston-cylinder combinations 24 forming parts thereof are provided on either side of apparatus 10 so that apparatus 10 may be positioned for travel along the side of a hill with one side of apparatus 10 higher than the remaining side. Extension or refraction of the piston members of piston-cylinder combinations 24 may be provided by manually powered hydraulics, by manual screw adjustments or by automatic height sensing devices connected to and actuating hydraulic valves to effectuate dynamic height adjustment.

As illustrated in FIG. 2, each wheel assembly housing 22 has a piston-cylinder combination 24 resident within a vertically elongated enclosure 29. The piston rod extends from piston-cylinder combination 24 downwardly, where the piston rod is denoted 31 in FIG. 2, into a tubular sleeve housing 26 and connects with a tubular extension member 25 which is slidably resident within tubular sleeve housing 26.

Affixed to a lower end of tubular extension member 25 is a wishbone-type wheel axle support 27 on which a wheel axle 28 is mounted and about which wheel 20 is rotatable. Wheels 20, illustrated in FIGS. 1 and 2, are preferably idler wheels in the embodiment of the invention which is pulled by a tractor.

Referring more specifically to FIG. 3, the effective independent constructions of the two sides of the harvesting apparatus is illustrated. A horizontal spacing bar 54 is adjustable to provide varying width between the two illustrated wheel assembly housings 22. Most desirably, connection of adjustable horizontal spacing bar 54 to respective wheel assembly housings 22 is pivotal so that the respective wheel assembly housings 22 may move independently one of another as the harvesting apparatus traverses rocky or uneven ground.

Figure 4:
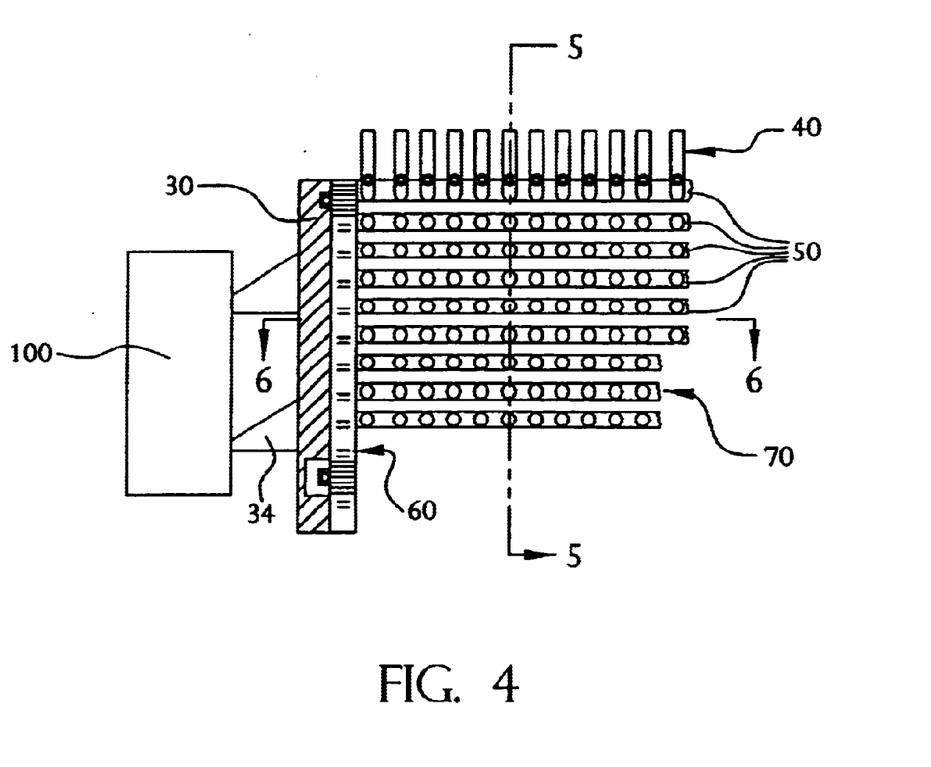
FIG. 4 is an enlarged broken side elevation of an array portion of the apparatus illustrated in FIG. 1.
Figure 6:
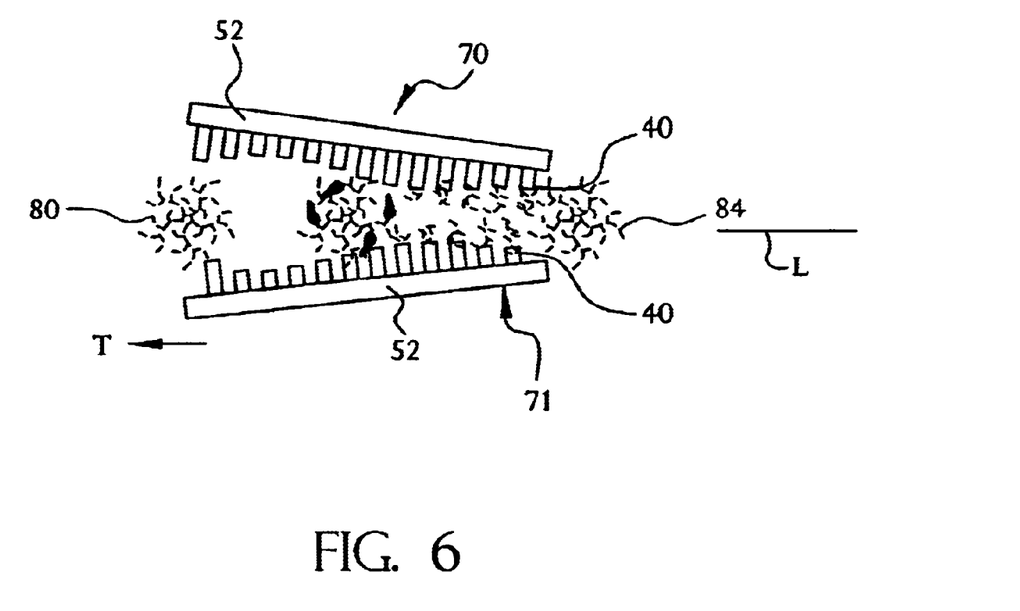
FIG. 6 is a partial top view of the array portion of the apparatus taken in the direction of arrows 6—6 in FIG. 4.

Referring more specifically to FIGS. 4, 5 and 6, in one preferred embodiment the arrays 70 and 71 each comprise elongated horizontal bars 50 attached at each bar end to respective endless chains 60 mounted in respective tracks 52 visible in FIGS. 5 and 6. Preferably resilient finger members 40 are preferably attached to elongated horizontal bars 50, which are hidden by tracks 52 in FIGS. 5 and 6.

The resilient finger members 40 preferably extend outwardly transversely from bars 50 and form combing array 70, 71 of finger members as illustrated generally in FIGS. 1, 4, 5, 6, 10, 11, 12 and 13. Arrays 70, 71 of preferably resilient finger members 40 are positioned to move vertically upwardly in their facing dispositions, as apparatus 10 passes through the growing field. Upward movement of arrays 70, 71, when in their facing positions as shown in FIG. 5, results in preferably resilient finger members 40 combing the plants to thereby remove fruits from the vinous plants as the fruits are contacted by finger members 40. As shown and discussed herein, plants with fruits are designated generally 80 and defruited plants are designated generally 84.

Figure 7:
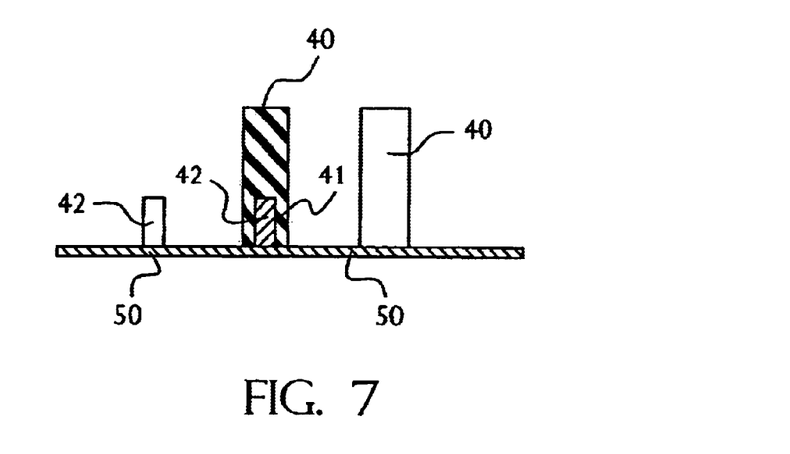
FIGS. 7, 8, and 9 are detailed views of different embodiments of the resilient finger members.

In one embodiment, shown in FIG. 7, each resilient finger member 40 is preferably mounted to one of elongated horizontal bars 50 by means of a receptacle 41 in resilient finger member 40 receiving and matingly engaging a like-shaped male member 42 protruding from the elongated horizontal bar 50. Alternately, resilient finger member 40 may be formed as a hollow cylinder, such as could be cut from a length of rubber hose, with the hollow open interior receiving and engaging with male member 42 portion of elongated horizontal bar 50. One exemplary embodiment of the invention uses one (1) inch outer diameter rubber hose segments that are six (6) to seven (7) inches in length as the resilient finger members 40. Such hose is mounted over steel pins defining male members 42 that are about three-eighths (3/8) inch in diameter and about three (3) inches long.

Figure 8:
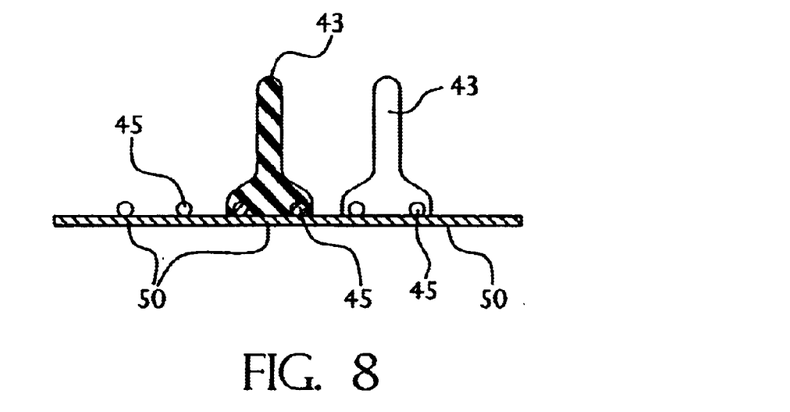

In an alternate embodiment shown in FIG. 8, a resilient finger member is denoted 43 and has two holes at the base through which attachment pins or rods 45 mount. Preferably all of the embodiments of resilient finger members 40, 43, and 44 are rubber. Preferably, the resilient finger members may be bent upwards, relative to the direction of travel of the fingers, as fingers 40 or 43 or 44 move upwardly with the vinous crop which is being harvested positioned therebetween; such curvature is illustrated in resilient finger member 44 depicted in FIG. 9. Within the contemplation of the invention are additional resilient finger member shapes, such as a hook-shapes, which may be particularly suited to the harvesting of bell peppers or other similar fruit.

The resilient finger members 40 or 43 or 44 of the two arrays 70, 71 may be positioned opposite one another or may be offset from corresponding finger members on the opposite array so that the finger members may effectively interdigitate either vertically or horizontally thereby to create a finger-type mesh for the capture of fruits as those fruits are stripped from the vinous plants due to the upward motion of the arrays 70, 71 and associated finger members 40 or 43 or 44 as the horizontal bars 50 or fabric webs travel along the endless paths defined by chains 60 traveling in tracks 52.

Resilient finger members depicted variously as 40, 43 and 44 in FIGS. 1 and 4 through 9 are depicted as having substantially the same length measured transversely to elongated horizontal bars 50.

In an additional embodiment of the invention, resilient finger members 40 may have differing lengths as indicated by the dotted line configurations of some of finger members 40 in FIG. 6. In particular, resilient finger members 40 are contemplated to be longer where the plants enter the mutually facing arrays 70, 71 depicted on the left in FIG. 6 as being at the front of the machine, and are contemplated to be shorter were the plants exit the mutually facing arrays 70, 71 towards the rear of the machine, depicted to the right in FIG. 6.

In the preferred embodiment of the invention, the two arrays 70 and 71 of resilient finger members 40 are preferably arranged cooperatively side-by-side as depicted in FIG. 5. A motor 100, depicted in FIG. 4, or power take-off from the pulling tractor (not shown), preferably engages endless chains 60 located in tracks 52, moving chains 60 and hence the connected aforementioned elongated horizontal bars 50 together with attached resilient finger members 40 or 43 or 44. Motor 100 drives endless chains 60 carrying each array 70 and 71 in opposite directions (when considered looking from the front to the rear of apparatus 10) denoted by arrows U and V in the drawings, particularly in FIG. 5, such that resilient finger members 40 or 43 or 44 of each of arrays 70 and 71 move in an upward direction denoted Z in the drawings including FIG. 5, when the resilient finger members traverse space between the mutually facing moving arrays 70 and 71.

As further depicted in FIG. 5, fruit lying on the ground 86 is desirably sweepingly engaged by resilient finger members 40 and swept along respective directions of finger member travel, U or V. This fallen fruit is swept initially in a horizontal direction at the bottom of arrays 70, 71 and is then drawn or carried in a vertical direction, as indicated by Arrow Z, upwardly in the space separating arrays 70 and 71 where those arrays face one another and are closely spaced. In addition, fruit still attached to the vine is engaged and removed from the vine by resilient finger members 40 as resilient finger members 40 comb the vinous plants in the generally upward direction, indicated by Arrow Z. Both fruit lifted from the ground and fruit combingly removed from the vine by apparatus 10 are transported upwardly by resilient finger members 40 in the space between arrays 70 and 71. Fruit carried by arrays 70 and 71 is removed from arrays 70 and 71 as the arrays move through arcs at the upper extremity of array travel.

Vertical adjustment of the arrays is preferably facilitated by piston-cylinder combinations 24 of wheel assembly housings 22, illustrated in FIGS. 1 and 2. If desired, piston-cylinder combinations 24 may be adjusted so as to raise arrays 70, 71 sufficiently far from ground 86 that no sweeping along ground 86 occurs. In such case, fruit lying on ground 86 remains on the ground. This may be desirable if the fruit is spoiled or bruised.

In a further aspect of the invention, stripping fruit from the vine and subsequent discharge from the space between array 70 and array 71 is facilitated by positioning resilient finger members 40 of array 70 for interleaving with resilient finger members 40 of array 71 when the two arrays are in close facing proximity to one another.

In yet a further aspect of the invention, arrays 70 and 71 are preferably angled with respect to each other, as illustrated in FIG. 6, relative to a longitudinal axis L which is coincident with the direction of travel through the growing field. In this angled configuration, the two mutually facing arrays 70 and 71 form a "V"-shape when viewed from above in FIG. 6. In this configuration, the plants enter the "V" at the wide end, at the left in FIG. 6, and exit at the narrow end, at the right in FIG. 6, as apparatus 10 moves through the growing field in the direction of arrow T. This "V"-shaped arrangement is advantageous for harvesting fruit, since the fruit is removed in stages, with fruit at the periphery of the plant being removed first, and the fruit towards the interior of the plant being removed later, as preferably resilient finger members 40 penetrate the plant more aggressively.

Fruit is desirably ejected upwardly when the fruit reaches the apex between array 70 and array 71 wherein dislodging of the fruit is aided by a high velocity blower that lifts and guides the fruit either to a conveyor belt 38 as depicted in FIG. 5 or to another collection system.

Ejection of peppers or other fruits from arrays 70 and 71 is facilitated when the resilient finger members 40 of array 70 are interleaved with the resilient finger members 40 of array 71.

In another aspect of the invention, spatial adjustability between array 70 and array 71 accommodates variable row spacing used in the farming industry. Row spacing used in the farming industry typically ranges from 12 to 40 inches. Therefor arrays 70 and 71 may be laterally adjusted to increase or decrease the space between interior vertically extending facing portions 72 and 74, shown in FIGS. 5 and 11, of arrays 70 and 71 to accommodate wider or narrower rows.

It is further preferable that arrays 70 and 71 be vertically adjustable to accommodate increased row heights and uneven field surfaces. Preferably, spatial adjustability is accomplished via manual screw adjustments or via an automated device or hydraulic systems. In a further embodiment of the invention preferably a hydraulic system provides vertical adjustability of arrays 70 and 71 to accommodate uneven surfaces and variable row heights.

In addition to accommodating variable row sizes, lateral adjustability of arrays 70 and 71 accommodates variations in the moisture content of the plants. Towards harvest day, moisture in a plant changes, thus requiring arrays 70 and 71 to be adjusted closer or farther apart depending on conditions.

In yet another embodiment of the invention, elongated horizontal bars 50 are not used. Instead, resilient finger members 40 attach to a wide belt or continuous web, the belt or web providing the function of elongated horizontal bars 50.

In another aspect of the invention, a plow snout 18 is frontwardly positioned and centrally located between arrays 70 and 71. Tip 16 of plow snout 18 is coincident with longitudinal axis A, depicted by vertical arrow Z arrays 70 and 71 in FIG. 5. Snout 18 guides and lifts plants thereby facilitating positioning of plants for entrance between mutually facing arrays 70 and 71.

Figure 10:
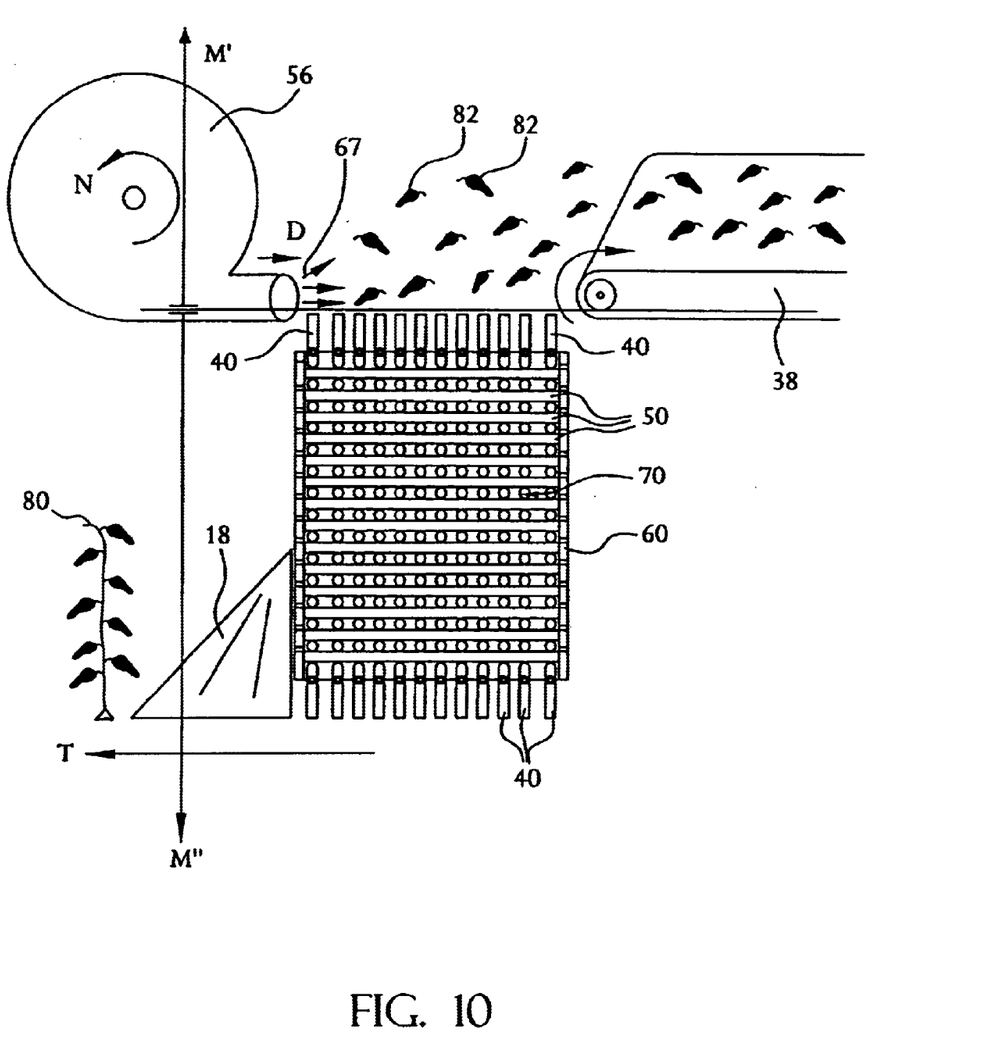
FIG. 10 is a schematic view, partially in side elevation and partially in isometric form, of the vegetable harvesting apparatus depicted in FIG. 1, without the wheel assembly portion.

Referring to FIG. 10, it is further preferable that upward ejection of peppers or other vegetables from arrays 70 and 71 be facilitated by a high velocity blower 56. Preferably, high velocity blower 56 is adjustably positioned and frontally located to create airflow from the front towards the back of apparatus 10, to lift and guide peppers or other vegetables towards a collection system such as a conveyor belt 38 depicted in FIG. 10 or other collection system. The direction of air flow expelled from high velocity blower 56 is designated D in FIG. 10.

Referring still to FIG. 10, for convenience of reference apparatus 10 may be considered to be divided into an upper area M' and a lower area M" by a horizontal axis M. In one aspect of the invention, high velocity blower 56 is adjustable to create a bi-level velocity wind system wherein the adjustable position and head of high velocity blower 56 is designated by directional arrow N in FIG. 10.

Preferably, high velocity blower 56 may be positioned to create a current of generally upwardly directed low velocity air within lower area M" to gently facilitate upward movement of peppers or other vegetables in the area between resilient finger members 40 thus easing peppers or other vegetables upward towards upper area M' without crushing the peppers or other fruits between resilient finger members 40. Once ejected from between the arrays 70 and 71 into upper area M', a high velocity air current desirably guides the peppers substantially horizontally towards a collection system, such as a conveyor belt 38. Thus, high velocity blower 56 minimizes discharge and re-entry of peppers or other vegetables into the space between arrays 70 and 71 and further assists in the pepper or other vegetable collection process.

Apparatus 10 preferably comprises a frame member preferably adapted to be pulled by a tractor via a hitch with a frame members, preferably a single longitudinal frame member, to which arrays 70, 71 may be mounted and the height of which adjusted, desirably by the wheel assemblies 22 with piston-cylinder combinations 24 in the drawings.

The apparatus preferably further includes a conveyor to receive separated fruits 82 from facing arrays 70, 71 and transport these separated fruits 82 to one or more intermediate conveyors or to a discharge position or to a gathering container, as desired. All of this is consistent with the disclosure of U.S. Pat. No. 6,282,877, referenced above, particularly the description appearing in columns 7 and 8 thereof.

The leveling function provided by piston-cylinder combinations 24 and the raising and lowering of the frame member and hence of the arrays to be more proximate to or separated from the growing ground, is consistent with that disclosed in U.S. Pat. No. 6,282,877, particularly columns 9 and 10 thereof, referenced above.

An important aspect of the invention is the adjustability of the bottom portion of the array to provide greater or lesser width of the moving array traveling substantially horizontally parallel with the growing ground and transversely to the direction of travel across the growing ground of the harvesting apparatus. Specifically, idler sprocket 66 is preferably adjustably moveable from the position illustrated in FIG. 5 to a position vertically displaced therefrom. In the position illustrated in FIG. 5, a moving web, optionally provided in place of or in addition to bars 50, substantially sweeps across the growing ground parallel to the ground as the web travels first around adjustable, moveable idler sprocket 66 and then around fixed idler sprocket 68. This sweeping action of the web transversely across the growing ground relative to the direction of travel of the harvesting apparatus, sweeps fruits which have dropped from the vines to the ground into the gathering area where those fruits may be carried upwardly by flexible finger members 40 and discharged from between the moving arrays onto a fruit conveyor 38 illustrated in FIG. 5.

The vertical dotted line in FIG. 5 denotes an alternate position for the backside of moveable array 71 where the backside denotes that the portion of moveable array 71 facing away from paired array 70. When horizontal ground sweeping to gather fallen fruit is not desired, adjustable moveable idler sprocket 66 may be removed and the web portion of moveable array 71 defined by horizontal rods or flexible fabric in the respective embodiments of the invention may be shortened so that moveable array 71 adopts the configuration of array 70 in FIG. 5. Alternatively, construction may be provided whereby adjustable moveable idler sprocket 66 may be raised into a position substantially off the ground so that moveable array 71 adopts a configuration approaching that of an isosceles triangle where the base of the triangle is the portion of the array 71 facing array 70.

The adjustability of the stripper head portion of the invention is a key feature. Such adjustability permits the stripper head to be moved so as to separate moveable arrays 70, 71 from one another or to place moveable arrays 70, 71 close to one another in a parallel disposition or to position moveable arrays 70, 71 in a V-shape, such as illustrated in FIG. 6, with the mouth of the V facing in the direction of travel of the harvesting apparatus. The V configuration facilitates gathering of bushy fruit carrying vine-type crops into the area between the facing moveable arrays. The converging V-shape facilitates more complete gathering and stripping of the ripe fruit from the vines than would otherwise be accomplished. The adjustability feature is preferably provided by a system of bolts which are slidably moveable in suitable slots and serve as the mounting and securing means for the stripper head defined by the moveable arrays on the frame. Such adjustability results in the ability to move the stripper head components, namely, the two moveable arrays which travel on their endless paths, and to reposition those arrays at different spacings from one another, which is important as harvesting conditions change during the work day and from day to day.

A further important feature of the invention is the provision of one or more fans working to blow detached fruits away from the moveable arrays thereby facilitating the gathering of the fruits without the stems, leaves and other assorted chaff which inherently results from the stripping process. One desirable position of such a fan is that illustrated for blower 56 in FIGS. 10, 12 and 13.

Figure 11:
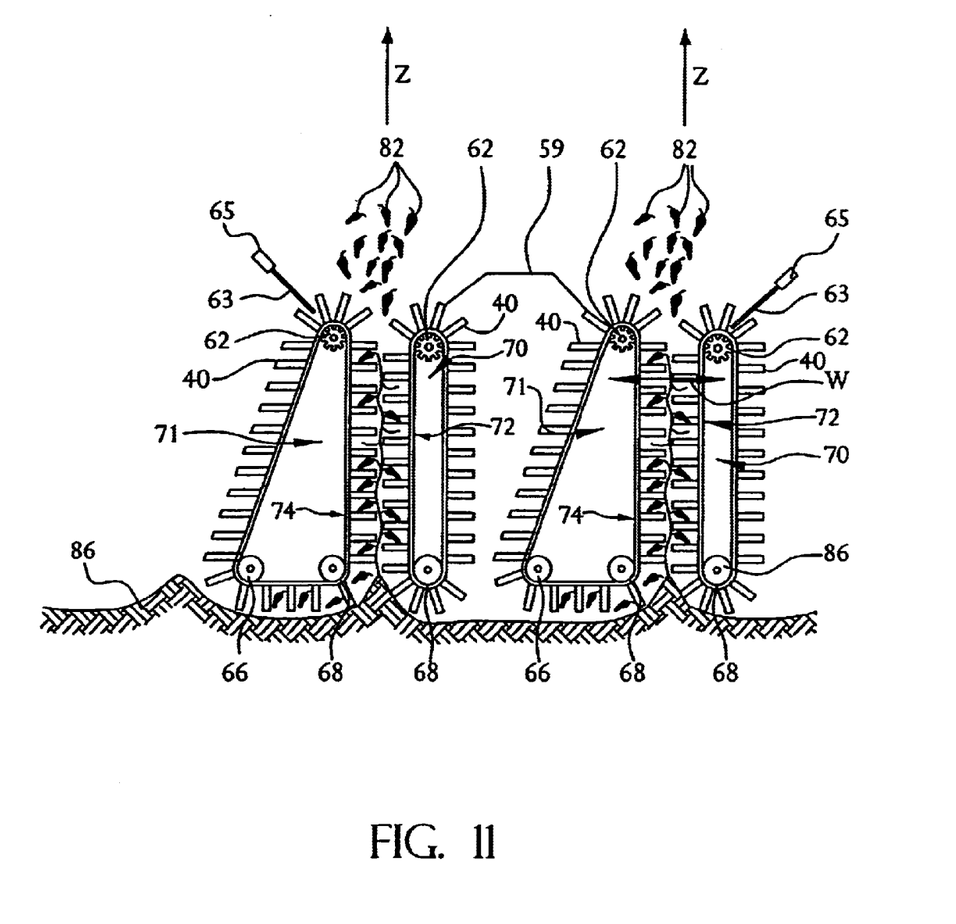
FIG. 11 is a schematic front elevation of a multiple row harvesting apparatus of the type depicted in FIG. 1 where the apparatus is adapted to harvest not only fruits from vinous crops growing in rows within the field, but also to gather fruits which have fallen from the vines and are lying on the ground.
Figure 12:
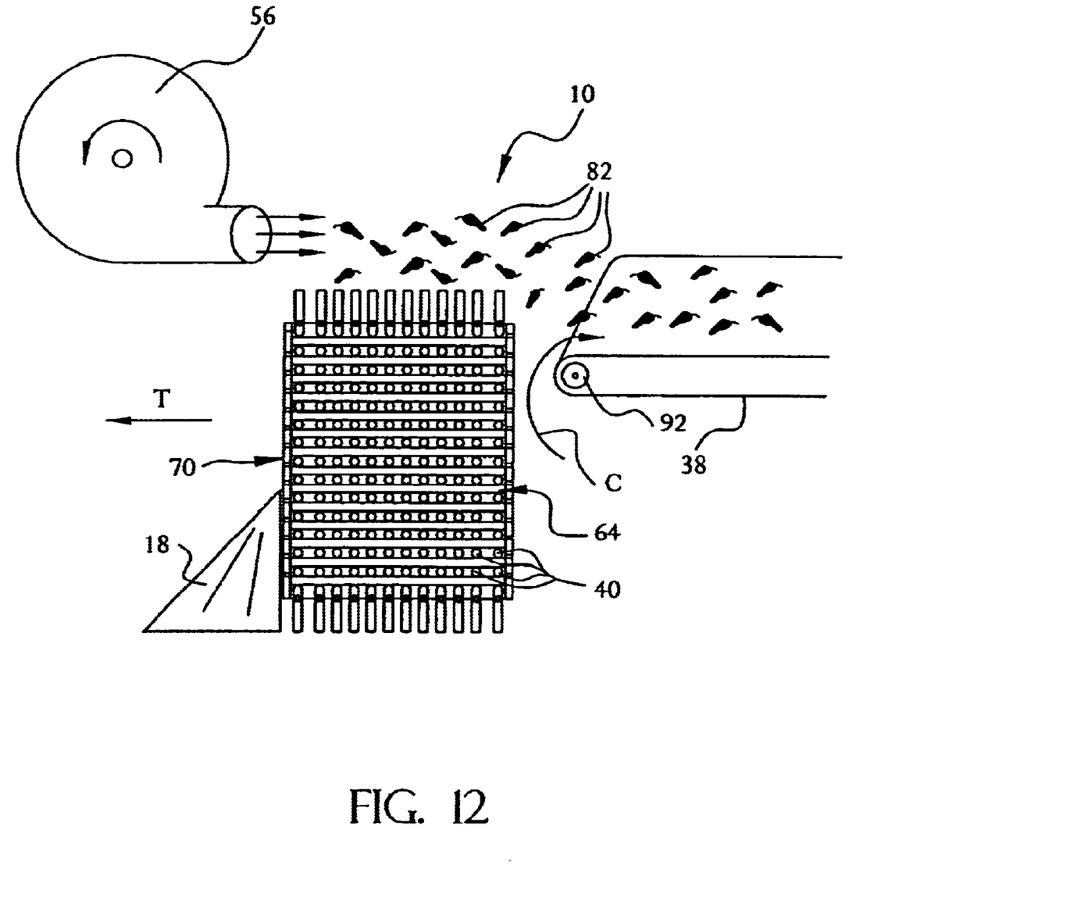
FIG. 12 is a schematic side elevation of a second embodiment of vegetable harvesting apparatus manifesting aspects of the invention.

Width wise adjustability of arrays 70, 71 is denoted by arrow W in FIG. 11.

Desirably, a shroud 59 may be positioned as illustrated in FIG. 11 where the tips of the shroud desirably slightly interferingly contact and engage the tips of finger members 40 traveling on arrays 70, 71, thereby to disengage any fruits which remain caught within fingers 40 of arrays 70 and 71 after the stripping operation. As an alternative to or complementary with shroud 59, a pair of venturis 65 having nozzles 63 may be provided to dislodge fruits which are carried by or caught in between fingers 40 of moveable arrays 70, 71 as those arrays move around on drive sprockets 62. Additional combinations of shrouds 59 and venturi 65 may be provided working cooperatively to engage fingers 40 of arrays 70, 71 as those arrays pass around drive sprocket 62 to further facilitate removal of fruits from the moving arrays, all as illustrated in FIG. 11. All of this together with air currents 67 created by blowers 56 work to remove fruits from the traveling arrays and position the fruits for conveyance to a gathering position such as by conveyor 38 illustrated in FIG. 13.

Figure 13:
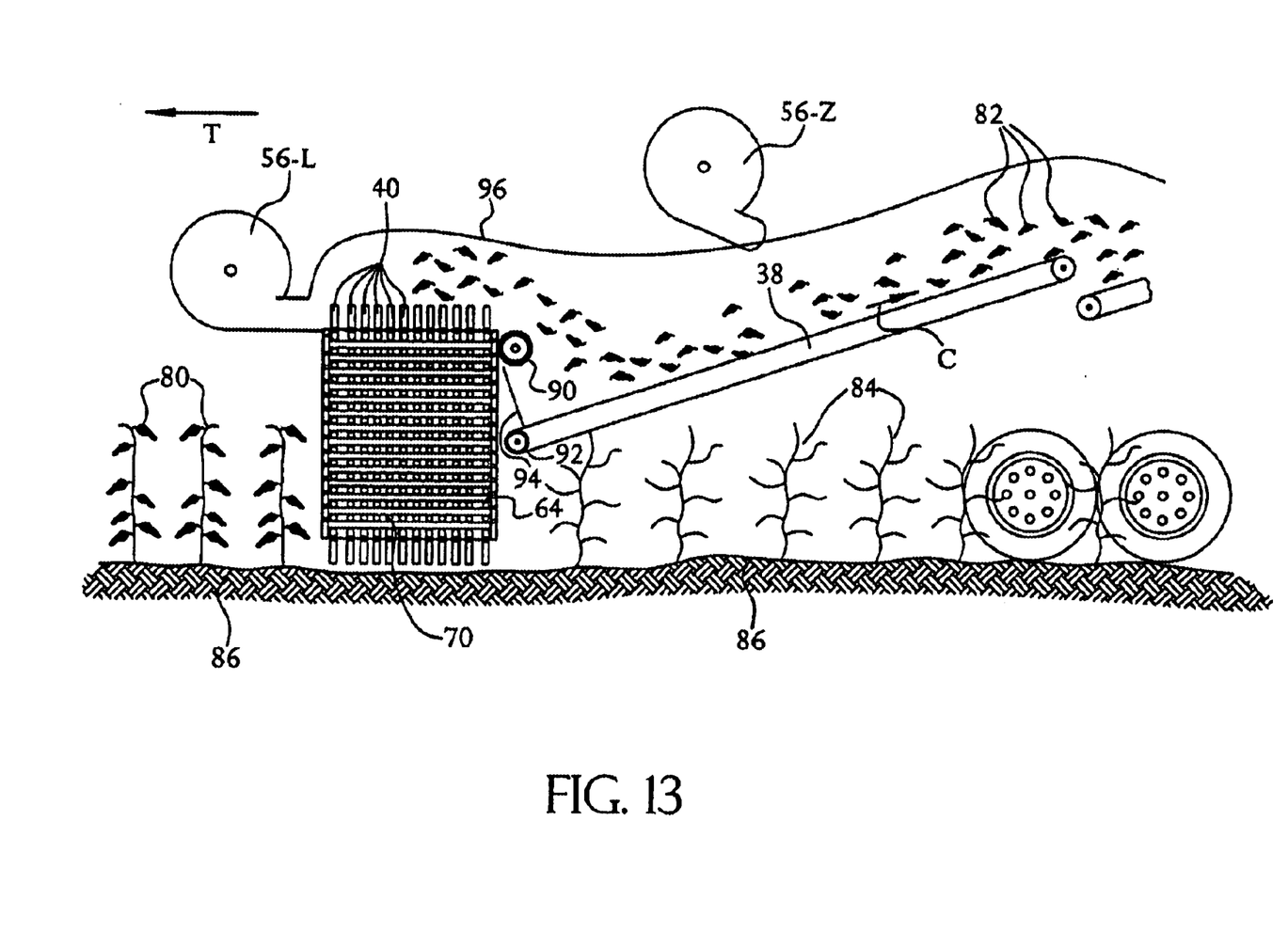
FIGS. 13 and 14 are a schematic side elevations of the second embodiment of vegetable harvesting apparatus illustrated in FIG. 12, showing an additional portion of the apparatus.
Figure 14:
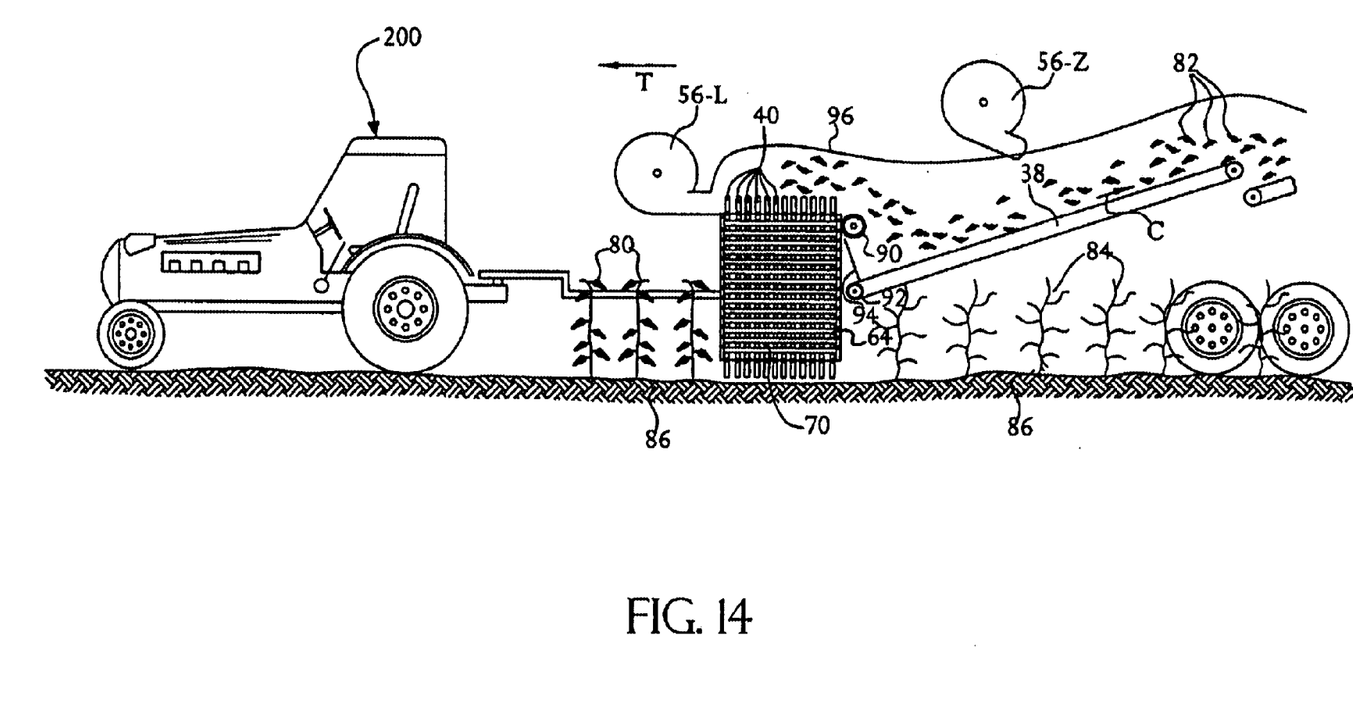

Referring to FIG. 13, blower 56-1 creates a venturi resulting in an air stream flowing up, through and around moveable arrays 70, 71. This creates a lifting effect for the fruit helping to remove the fruit from the fingers of the arrays. Blower 56-2 may also be used in the removal of heavy fruit, but is believed not to be needed for most conditions.

A rotating pipe roller 90 prevents dirt build up and plug ups as dust and small dirt particles tend to be carried due to the pneumatic action. Conveyor belt 38 is preferably driven by conveyor belt drive sprocket 92 illustrated in FIG. 12 with conveyor belt 38 moving in the direction indicated by arrow C in FIG. 12. A shield 94, depicted in FIG. 13, prevents detached fruits from escaping from the lower end of conveyor 58.

The apparatus preferably includes an overhead shroud 96 illustrated in FIG. 13.

Desirably, each moving array 70, 71 has a separate speed control.

As a result of the adjustability feature of the moveable arrays 70, 71, the harvester may work in raised beds or on flat ground and in either case achieve excellent crop recovery. The harvester apparatus has been found to work well with both single and double row plantings, successfully harvesting banana, jalapeno and hot cherry peppers. Width adjustability of moveable arrays 70, 71 allows accommodation of 20 to 40 inch row spacing.

In one embodiment, finger members 40 are approximately 3 inches long but may be longer. Note that with the arrangement provided for mounting the finger members, a single machine may be used with different length fingers depending upon the product being harvested and the conditions under which the harvest is being conducted. In that regard, the spacing and arrangement of the fingers 40 on arrays 70, 71 need not be the regular, rectangular row and column spacing illustrated in the drawings. Other spacings and arrangements may be used.

Figure 9:
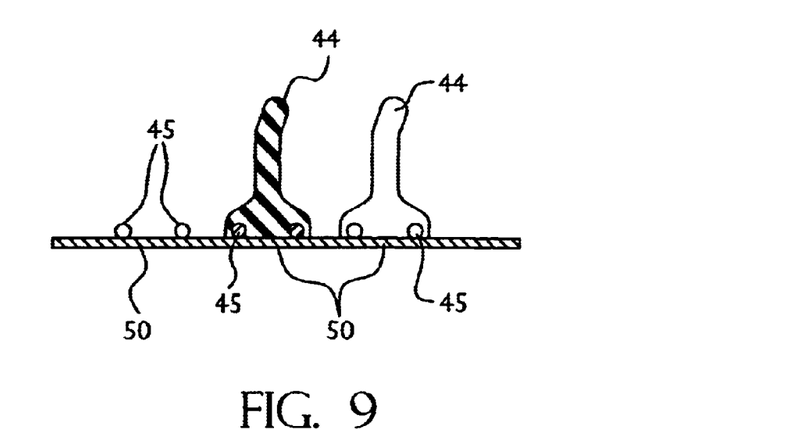

Another important feature is the interchangeability of the finger members resulting from the various finger mounting arrangements on the horizontal bars as illustrated in FIGS. 7, 8 and 9. Specifically, in one arrangement, horizontal bars 50 may be equipped with rods 45 running longitudinally along bars 50 and transversely to the direction of travel of moveable arrays 70, 71. Fingers 43 and 44 may have suitable receptacles molded into the bottoms of those fingers to fit over rods 45. This facilitates rapid changeover from one finger configuration to another in the event weather or harvesting conditions change.

While in the invention has been disclosed and is claimed as a tractor pullable harvesting apparatus, the invention may also be implemented as an alternate head attachment to a corn picker, combine or other harvesting equipment or still further may be implemented as a self-contained, self-propelled harvester.

While the invention has been described with respect to the preferred and alternate embodiments disclosed in the preceding text and the accompanying drawings, the invention is not limited to the embodiments, approaches, techniques and structure disclosed, but is intended to embrace all subject matter defined by the claims appended hereto including operational and functional equivalents thereof.

What is claimed is:

1. Harvesting apparatus comprising:
a. a frame;
b. wheels connected to said frame enabling travel of said apparatus through a growing field of vegetables; and
c. at least one pair of mutually facing movable arrays of finger members carried by said frame for strippingly lifting fruits from plants in said growing fields, said arrays being substantially planar configuration in the region of their mutually facing, and wherein said finger members are positioned in substantially horizontal series so that, during travel, a successive finger member in the series is positioned to lift fruit that a previous finger member in the series unsuccessfully attempted to lift.

2. Apparatus of claim 1 wherein each array comprises:
a. a plurality of longitudinally elongated horizontal bars;
b. a plurality of transversely elongated finger members connecting to and extending substantially transversely from said bars; and
c. an endless member connected to said bars for carrying said bars along an endless path, a substantially vertical portion of which path positions said bars so that said fingers attached to said bars extend towards fingers associated with said mutually facing array as said bars travel upwardly along said path and upwardly strip vegetable fruits from fruit bearing plants passing between said mutually facing arrays as said apparatus traverses said growing field.

3. Apparatus of claim 2 further comprising:
a. means for moving said mutually facing arrays along an endless circular path by advancing said members therealong;
b. a plow connected to said frame for lifting and positioning plants for entry into space between said mutually facing arrays; and
c. means for providing a directionally adjustable air current for lifting and directing harvested fruits or vegetables exiting from between said arrays at the upper extremities thereof towards a collection area.

4. Apparatus of claim 1 further comprising means for vertically adjusting said mutually facing arrays relative to said frame to enable said mutually facing arrays to accommodate therebetween plants growing on uneven surfaces and in varying row heights.

5. Apparatus of claim 1 further comprising a hitch for connecting the frame to a tractor or pulling machine.

6. Apparatus of claim 1 wherein at least some of said wheels inwardly connect to the frame via a wheel assembly comprising a hydraulic piston cylinder combination for vertically adjustably positioning the associated wheel relative to said frame.

7. Apparatus of claim 1 further comprising means for adjusting distance of separation between mutually facing arrays.

8. Apparatus of claim 2 wherein said finger members further comprise receptacle means for attaching to elongated horizontal bars.

9. Apparatus of claim 1 further comprising means for independently vertically positioning said arrays relative to said frame for travel through said growing field.

10. Apparatus of claim 1 wherein said finger members are resilient.

11. Apparatus of claim 1 wherein said finger members are elastomeric.

12. Apparatus of claim 1 wherein said finger members are homogeneous.

13. Apparatus of claim 2 wherein said finger members and said bars are of integral, one piece construction.

14. Apparatus of claim 1 wherein said arrays include sheet-like planar portions with pluralities of finger members projecting substantially transversely therefrom.

15. Apparatus of claim 1 wherein said arrays are of integral, one piece molded construction with said finger members and said sheet-like portions being homogeneous.

16. Apparatus of claim 1 wherein said finger members are rigid.

17. Apparatus of claim 2 wherein finger members of said two arrays interdigitate in at least a portion of the region in which said arrays are mutually facing.

18. Apparatus of claim 1 wherein said arrays are more proximate one another remote from the position of entry of said fruit-bearing plants between said arrays than at said entry position.

19. Apparatus of claim 1 wherein said facing portions of said arrays are more proximate one another remote from the growing field than at ground level.

20. Vegetable or fruit harvesting apparatus comprising:
 a. a frame;
 b. wheels connected to said frame enabling travel of said apparatus through a growing field of said vegetables;
 c. at least one pair of mutually facing arrays of resilient finger members for strippingly lifting fruits from vegetable plants in said growing fields, said arrays being generally upstanding, longitudinally elongated longitudinally converging substantially planar configuration, each array comprising:
  i. a longitudinally extending endless member selected from the group consisting of fabric, flexible rubber, metal or a plurality of longitudinally elongated horizontal bars configured to form a sheet-like supporting structure said fingers extending substantially lateral therefrom;
  ii. means for adjusting width between said mutually facing arrays;
  iii. means for vertically adjusting said mutually facing arrays relative to said frame to enable said apparatus to function on uneven surfaces and harvest variable row heights;
  iv. a plurality of transversely elongated finger members connecting to an extending from said longitudinally extending endless sheet-like member;
  v. an endless drive member connected to said longitudinally extending sheet-like member along an endless path, a substantially vertical portion of which path positions said longitudinally extending sheet-like member so that said fingers attached to said sheet-like member extend towards fingers associated with said mutually facing array as said sheet-like member travels along said path and upwardly strips fruits from plants passing between said mutually facing arrays as said apparatus traverses said growing field;
  vi. means for propelling said mutually facing arrays along endless paths defined by said drive members;
  vii. a plow connected to said frame for lifting and positioning plants proximate the space between mutually facing arrays; and
  viii. means for providing directionally adjustable air for pneumatically lifting and directing harvested fruits or vegetables exiting an upper portion of said space between said arrays towards a collection area.

21. Apparatus of claim 20 wherein the means for supplying energy to propel mutually facing arrays along an endless path comprises a motor.

22. Apparatus of claim 20 wherein the means for providing directionally adjustable air current comprises a high velocity blower.

23. A method of harvesting comprising:
 a. advancing a harvester through a growing field;
 b. scoopingly directing plants towards an opening between mutually facing arrays;
 c. advanceably positioning mutually facing movable arrays of substantially horizontal series of resilient finger members on opposite sides of plants containing fruits to be harvested;
 d. rotating said mutually facing arrays of resilient finger members whereby one array rotates in a clockwise direction and the other in a counter-clockwise direction and both arrays move upwardly in a region in which said arrays are mutually facing above plants in a growing field from which fruits are to be harvested thereby upwardly sweeping the plants with resilient finger members to strippingly remove fruits from the plants;
 e. advanceably positioning mutually facing movable arrays of resilient finger members so that a successive resilient finger member in the series is advanceably positioned to remove fruit that a previous resilient finger member in the series unsuccessfully attempted to remove.

24. The method of claim 23 wherein the harvester is advanced by a tractor through the growing field.

25. The method of claim 23 further comprising adjusting the spatial width between said mutually facing arrays.

26. The method of claim 25 further comprising vertically adjusting the clearance of said arrays from the ground.

27. The method of claim 23 further comprising transversely sweeping the growing ground during harvester travel thereover to brushingly gather detached fallen fruits off of the ground and into the region within which said arrays face one another.

28. A method of harvesting comprising:
 a. advancing a harvester through a growing field;
 b. scoopingly directing plants towards an opening between mutually facing arrays;
 c. advanceably positioning mutually facing movable arrays of resilient finger members on opposite sides of plants containing fruits to be harvested;
 d. rotating said mutually facing arrays of resilient finger members whereby one array rotates in a clockwise direction and the other in a counter-clockwise direction and both arrays move upwardly in a region in which said arrays are mutually facing above plants in a growing field from which fruits are to be harvested thereby upwardly sweeping the plants with resilient finger members to strippingly remove fruits from the plants;
 e. pneumatically propelling harvested fruits at the upper boundary of where said stripping occurs towards collection device.

29. The method of claim 28 wherein said sweeping and brushingly gathering is performed by rotation of at least one of said arrays to position said resilient finger members substantially perpendicularly to the ground and thereafter to move said perpendicularly positioned finger members transversely thereover from a position to a position proximate said mutually facing portions of said arrays.

30. Harvesting apparatus comprising:
 a. a frame;
 b. wheels connected to said frame enabling travel of said apparatus through a growing field of fruits; and
 c. at least one pair of mutually facing movable endless webs supporting vegetation stripping means protruding from the web surface, said webs being carried by said frame for strippingly lifting fruits from plants in said growing fields as said webs move along said field with said plants entering between upwardly moving facing portions of said webs, said webs substantially planar in the region of their mutually facing, and wherein said stripping means are positioned in substantially horizontal series so that, during travel, a successive stripping means in the series is positioned to lift fruit that a previous stripping means in the series failed to lift.

31. Harvesting apparatus comprising:

a. a frame;

b. wheels connected to said frame enabling travel of said apparatus through a growing field of fruits; and c. an endless movable array of finger members carried by said frame for contacting and strippingly lifting fruits from plants in said growing fields, said array having at least a portion which is substantially planar along which said finger members endlessly move upwardly while strippingly lifting said fruits as said apparatus travels through said growing field and wherein said finger members are positioned in substantially horizontal series so that, during travel, a successive finger member in the series is positioned to lift fruit that a previous finger member in the series unsuccessfully attempted to lift.

32. Apparatus of claim 31 wherein said array comprises a continuous flexible web with a plurality of transversely elongated finger members connecting to and extending substantially transversely from said web.

33. Apparatus of claim 31 wherein said finger members are flexible.

34. Apparatus of claim 32 wherein said finger members are flexible.

35. Harvesting apparatus comprising:

a. a frame;

b. wheels connected to said frame enabling travel of said apparatus through a growing field of fruits;

c. an endless movable array of finger members carried by said frame for contacting and strippingly lifting fruits from plants in said growing fields, said array being generally upstanding, longitudinally elongated and having at least a portion which is substantially planar along which said finger members endlessly move upwardly while strippingly lifting said fruits as said apparatus travels through said growing field; and d. means for providing a directionally adjustable air current for lifting and directing harvested fruits carried by and exiting from said array at the upper extremities thereof towards a collection area.

36. Apparatus of claim 35 wherein said finger members are flexible.

* * * * *